C. H. KUHLMAN.
SWITCH BOX.
APPLICATION FILED JAN. 29, 1920.
1,393,794.
Patented Oct. 18, 1921.
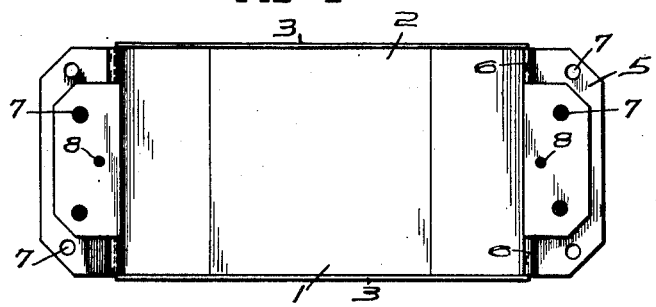
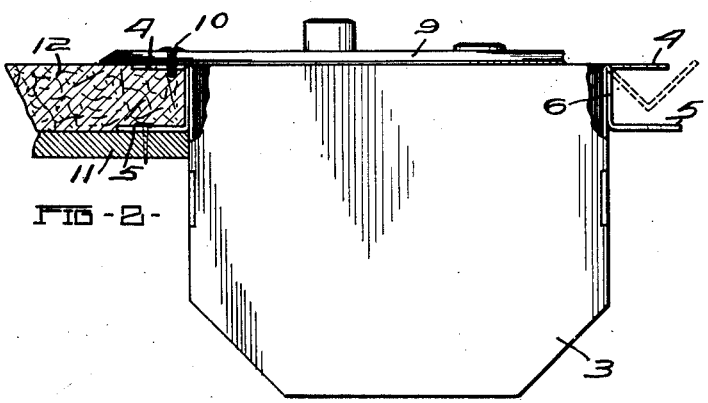
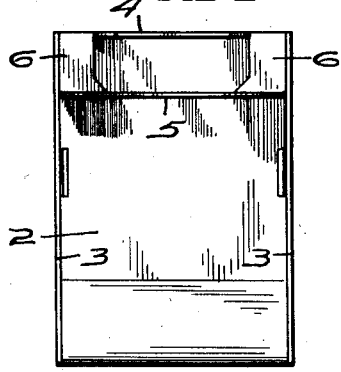
INVENTOR
Carl H. Kuhlman,
by
Owen, Owen & Crampton

UNITED STATES PATENT OFFICE

CARL H. KUHLMAN, OF TOLEDO, OHIO.

SWITCH-BOX.

1,393,794.            Specification of Letters Patent.      Patented Oct. 18, 1921.

Application filed January 29, 1920. Serial No. 354,815.

*To all whom it may concern:*

Be it known that I, CARL H. KUHLMAN, a citizen of the United States, and a resident of Toledo, in the county of Lucas and State of Ohio, have made an Invention Appertaining to Switch-Boxes; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a switch box of the type that is commonly set into a wall and is usually provided with one or more switches located on the cover of the box and wherein the switch box is provided with means for securing the box to the wall either through the plaster or beneath the plaster. By my invention is provided a switch box which may be secured in position either before the plaster has been applied or after the plaster has been applied. In switch boxes containing my invention, removable lugs or flanges are disposed at the sides of the box and at such a point with reference to the outside edge of the box that will hold the outside edge of the box flush with the plaster of the wall when the plaster has been applied, and also lugs or flanges located at the outside edge of the box that may be placed against the outside of the plaster and connected through the plaster to the wall, when, however, the first named flanges have been removed.

The invention may be contained in switch boxes having flanges or lugs of different forms and still come within the scope of the invention as set forth in the claims. To illustrate a practical application of the invention I have selected a switch box having the flanges or lugs and shall describe it hereinafter. The switch box selected is illustrated in the accompanying drawings.

Figure 1 of the drawings illustrates a top view of the box. Fig. 2 illustrates a side view of the box and Fig. 3 illustrates an end view of the box.

1 is the switch box for containing the insulated wires that are connected with the switch that is placed on or forms a part of the cover plate of the box. The box is preferably formed of the strip 2 that is bent so as to form the bottom of the box and two of the sides of the box. The other two sides of the box are formed of two pieces of sheet metal 3 that are interconnected or interlocked with the edges of the strip 2 in any suitable manner. In forming the strip 2 in the construction of the box, the ends of the strip 2 are cut so as to leave integral with the ends of the box, lugs or flanges 4 which are preferably oblong and extend along the part of the upper or outer edge of the box. The flanges 4 are bent so as to extend at right angles to the sides of the box to which they are connected or form a part of. The portions of the strip 2 that is left at the ends of the flanges 4 are bent sharply downward and so that substantially the whole of that portion of the strip 2 will lie in contact with the sides of the box formed by the strip 2. They are then bent at right angles to the sides of the box formed by the strip 2. Preferably, I so cut the ends of the strip 2 in forming the flanges 4 that the width of the flanges 4 will be about the thickness of the plaster and so as to leave at the ends of the strip 2 extending beyond the portions of the cuts that form the side edges of the flanges, enough of the strip that it will form flanges when bent as described and shown, that will have a width greater than the width of the flanges 4. This will form the flanges 5 which will be located beneath the flanges 4 about the thickness of the plaster and which will extend slightly farther from the sides of the box formed by the strip 2 than the flanges 4 extend. The flanges 5 will thus be connected to the upper edge or front edge of the box by narrow strips 6 which are located at the ends of the flanges 4 and 5 and connect to the edges of the box at the inner corners of the flanges 4.

The flanges 4 and 5 are provided with nail holes 7 through which nails may be driven to secure the switch box to the wall, such as to the lath or the studding, or both. If the nails are driven through the openings 7 of the flanges 4 they will pass through the plaster. The flanges 4 are provided with tapped openings 8 for securing the switch plate or face plate 9 of the switch box by means of the screws 10. The face plate 9 will extend well over the edges of the box 1 to cover the plaster edges surrounding the switch box.

If the switch box is placed during the construction of the building, the box is secured in position by nailing through the flanges 5 as to the lath 11 whereupon the plaster 12 may be, when applied, filled so as to be flush with the flanges 4 whereupon the plate 9 may be secured in position by connecting the plate to the flanges 4. If, however, the switch box is placed in position after the plaster has been placed, the flanges 5 may be easily disconnected from the box by reason of the sharp angle at which the metal is bent at the point that the strips 6 are connected with the body of the strip 2. Merely raising the flanges 5 by causing them to rotate so as to bend the strip upward about the edges of the box where they connect to the box will cause them to immediately break off, whereupon the box may be inserted into the opening that is formed in the plaster and lath and secured by nails that may be passed through the openings 7 whereupon the cover plate or switch plate 9 may be secured to the flanges 4.

I claim:

1. In a sheet metal switch box for plastered walls, the sides of the box having flanges extending at right angles to the sides, one set of the flanges located at the front edges of the box and the other set of flanges located away from the edges of the box a distance equal to the thickness of the plaster and connected to the edges of the sides of the box by narrow strips formed integral with the sides of the box and the last named flanges, the said strips being bent sharply downward and against the sides of the box and severable by return movements of the strips and the second named flanges.

2. In a sheet metal switch box for plastered walls, the sides of the box having flanges extending at right angles to the sides, one set of flanges located at the front edges of the box and the other set of flanges located away from the edges of the box a distance equal to the thickness of the plaster and connected to the edges of the sides of the box by narrow strips formed integral with the sides of the box and the last named flanges and connected to the sides of the box in the same plane as the first named flanges, the said strips being bent sharply downward and against the sides of the box and severable by return movements of the strips and the second named flanges.

In testimony whereof I have hereunto signed my name to this specification.

CARL H. KUHLMAN.